US008587803B2

(12) United States Patent
Miyazawa

(10) Patent No.: US 8,587,803 B2
(45) Date of Patent: Nov. 19, 2013

(54) PRINTING DEVICE, METHOD AND COMPUTER READABLE MEDIUM FOR EXECUTING PRINT JOB

(75) Inventor: Masafumi Miyazawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 959 days.

(21) Appl. No.: 12/244,080

(22) Filed: Oct. 2, 2008

(65) Prior Publication Data

US 2009/0086270 A1    Apr. 2, 2009

(30) Foreign Application Priority Data

Oct. 2, 2007    (JP) ................. 2007-258935

(51) Int. Cl.
*H04N 1/00*    (2006.01)
*G06K 15/00*    (2006.01)
*G06F 3/12*    (2006.01)

(52) U.S. Cl.
USPC .......... 358/1.15; 358/401; 358/403; 358/404; 358/405; 358/426.06; 358/426.07; 358/1.13; 358/1.14; 358/1.16

(58) Field of Classification Search
None
See application file for complete search history.

(56) References Cited

U.S. PATENT DOCUMENTS

| 5,854,693 | A  | * | 12/1998 | Yoshiura et al. ............. 358/468 |
| 7,249,900 | B1 | | 7/2007 | Katano et al. |
| 7,808,672 | B2 | | 10/2010 | Wu |

| 2004/0066530 | A1 | | 4/2004 | Wu | |
| 2005/0128517 | A1 | * | 6/2005 | Sakamoto ................... 358/1.15 |
| 2005/0275867 | A1 | * | 12/2005 | Higashiura et al. .......... 358/1.14 |

FOREIGN PATENT DOCUMENTS

| JP | 5-265668 | | 10/1993 |
| JP | 7-129336 | | 5/1995 |
| JP | 10326163 | A | 12/1998 |
| JP | 2000-137591 | | 5/2000 |
| JP | 2001-236184 | | 8/2001 |
| JP | 2002-7084 | | 1/2002 |
| JP | 2002-010004 | A | 1/2002 |
| JP | 2004-21453 | | 1/2004 |
| JP | 2004-127133 | A | 4/2004 |
| JP | 2004-220353 | | 8/2004 |
| JP | 2005-193408 | A | 7/2005 |
| JP | 2007-094721 | A | 4/2007 |
| JP | 2007-142800 | | 6/2007 |

OTHER PUBLICATIONS

Konishi Daishi; "Original reader/recorder"; JP Pub Date Jan. 2002; Machine translation in english of JP Pub No. 2002010004.*

(Continued)

*Primary Examiner* — Benny Q Tieu
*Assistant Examiner* — Haris Sabah
(74) *Attorney, Agent, or Firm* — Scully, Scott, Murphy & Presser, P.C.

(57) ABSTRACT

There is provided a printing device, comprising: a data receiving unit configured to receive print job data; a buffer used to store the print job data; a judgment unit configured to judge whether the print job data received by the data receiving unit can be stored in available space of the buffer; and a deletion target extraction unit configured such that, in response to the judgment unit judging that the print job data received by the data receiving unit can not be stored in available space of the buffer, the deletion target extraction unit extracts deletion target print job data which can de deleted from the buffer, from among one or more pieces of print job data stored in the buffer.

10 Claims, 10 Drawing Sheets

(56) References Cited

OTHER PUBLICATIONS

Device for Forming . . .Program; "Ito et al."; JP Pub Date Jun. 2007; Machine translation in english for JP Pub No. 2007142800.*

Extended European Search Report dated Jan. 5, 2010.

Notice of Allowance issued in Japanese counterpart application No. 2007-258935, mailed Mar. 21, 2012.

* cited by examiner

| JOB ID | URL | BUFFER SIZE | DATA SIZE | PRINT DESIGNATION TIME | RE-READING | DELETION |
|---|---|---|---|---|---|---|
| AAA | http://www.portal.co.jp/job/AAA.dat | 4000000 | 4000000 | 2007-09-01:10:05:00 | Possible | |
| BBB | http://www.portal.co.jp/job/BBB.dat | 1000000 | 1000000 | 2007-09-01:10:35:00 | Possible | O |
| CCC | http://www.portal.co.jp/job/CCC.dat | 0 | 5000000 | 2007-09-01:18:20:00 | Possible | |
| DDD | http://www.portal.co.jp/job/DDD.dat | 0 | 950000 | 2007-09-02:07:50:00 | Possible | |

| JOB ID | URL | PRINT DESIGNATION TIME | DATA SIZE |
|---|---|---|---|
| AAA | http://www.portal.co.jp/job/AAA.dat | 2007-09-01:10:05:00 | 4000000 |
| BBB | http://www.portal.co.jp/job/BBB.dat | 2007-09-01:10:35:00 | 1000000 |
| CCC | http://www.portal.co.jp/job/CCC.dat | 2007-09-01:18:20:00 | 5000000 |
| DDD | http://www.portal.co.jp/job/DDD.dat | 2007-09-02:07:50:00 | 950000 |

FIG. 6

| JOB ID | XXX |
|---|---|
| URL | http://www.portal.co.jp/job/AAA.dat |
| PRINT DESIGNATION TIME | 2007-09-01:10:05:00 |
| PRINT DATA | 07F6DC728C82BA54374D900F07BC0197 49BAF8767DA890018674B898C90D24AC D7780BE243786071··· |

FIG. 7

PRINTING DEVICE, METHOD AND COMPUTER READABLE MEDIUM FOR EXECUTING PRINT JOB

CROSS-REFERENCE TO RELATED APPLICATION

This application claims priority under 35 U.S.C. §119 from Japanese Patent Application No. 2007-258935, filed on Oct. 2, 2007. The entire subject matter of the application is incorporated herein by reference.

BACKGROUND

1. Technical Field

Aspects of the present invention relate to a printing device having a reserved print function of executing a print job at a preliminary designated time.

2. Related Art

Print systems having a function of executing a print operation for print job data at a preliminary designated time have been proposed. An example of such a print system is disclosed in Japanese Patent Provisional Publication No. 2001-236184 (hereafter, referred to as JP 2001-236184A). The print system includes an information terminal and a printing device connected to each other via a network. In the print system, the information terminal transmits a print job to the printing device and the information terminal is allowed to set a print designation time at which the print job is to be subjected to the print operation by the printing device. Such a print function of executing a print job at a preliminary designated time is frequently called a reserved print function.

The printing device having the reserved print function is provided with a print data buffer for temporarily storing print job data transmitted from the information terminal. The printing device keeps the print job data in the print data buffer until the print designation time designated in the print job data is reached. When the print designation time is reached, the printing device executes a print operation for the print job data. After the print operation is finished, the printing device deletes the print job data from the print data buffer.

SUMMARY

However, the above described printing device having the reserved print function has the following drawbacks. Considering a situation where a date which is considerably ahead of the current time (e.g., one week, one month or one year ahead of the current time) is designated as the print designation time, the print job data remains in the print data buffer for a relatively long time period until the print designation time is reached. Since the size of the print data buffer is limited, available space of the print data buffer may become exhausted if a number of pieces of print job data to be remained in the print data buffer for a relatively long time period are stored.

If the space of the print data buffer is exhausted, the printing device becomes unable to accept new print job data even if the print designation time of the new print job data is close to the current time. Such a drawback may occur if the size of the print data buffer is small or the amount of the received print job data is large.

Aspects of the present invention are advantageous in that a printing device capable of smoothly execute the reserved print function by effectively using a print data buffer is provided.

According to an aspect of the invention, there is provided a printing device, comprising: a data receiving unit configured to receive print job data; a buffer used to store the print job data; a judgment unit configured to judge whether the print job data received by the data receiving unit can be stored in available space of the buffer; and a deletion target extraction unit configured such that, in response to the judgment unit judging that the print job data received by the data receiving unit can not be stored in available space of the buffer, the deletion target extraction unit extracts deletion target print job data which can de deleted from the buffer, from among one or more pieces of print job data stored in the buffer.

Since the deletion target extraction unit extracts the deletion target print job data to be deleted from the buffer, it becomes possible to secure available space in the buffer. Consequently, it becomes possible to prevent reception of the print job data requiring immediate execution of the print operation, from denied due to shortage of the available space of the buffer. Therefore, it becomes possible to effectively use the buffer and to perform the reserved print function smoothly.

In at least one aspect, the printing device further comprises a buffer controller that controls the buffer such that: in response to the judgment unit judging that the print job data received by the data receiving unit can not be stored in available space of the buffer, the deletion target print job data is deleted from the buffer; and in response to a fact that available space for storing the print job data received by the data receiving unit is secured in the buffer, the print job data received by the data receiving unit is stored in the buffer. In this case, the deletion target extraction unit extracts the print job data having a print designation time which is later than that of the print job data received by the data receiving unit, from the one or more pieces of print job data in the buffer.

Since the print job data having a print designation time which is later than that of the print job data received by the data receiving unit is targeted for deletion from the buffer, it becomes possible to print preferentially the print job data having the relatively late print designation time. Consequently, it becomes possible to prevent reception of the print job data requiring immediate execution of the print operation, from denied due to shortage of the available space of the buffer.

According to another aspect of the invention, there is provided a method to be implemented on a printing device performing a printing operation, comprising the steps of: receiving print job data; judging whether the received print job data can be stored in available space of a buffer for storing the print job data, and extracting deletion target print job data which can de deleted from the buffer, from among one or more pieces of print job data stored in the buffer in response to a judgment result that the received print job data can not be stored in available space of the buffer.

Since the deletion target extraction unit extracts the deletion target print job data to be deleted from the buffer, it becomes possible to secure available space in the buffer. Consequently, it becomes possible to prevent reception of the print job data requiring immediate execution of the print operation, from denied due to shortage of the available space of the buffer. Therefore, it becomes possible to effectively use the buffer and to perform the reserved print function smoothly.

In at least one aspect, the method further comprises the step of controlling the buffer such that: in response to the judgment result that the received print job data can not be stored in available space of the buffer, the deletion target print job data is deleted from the buffer; and in response to a fact that available space for storing the received print job data is secured in the buffer, the received print job data is stored in the buffer. In this case, in the step of extracting, the print job data having a print designation time which is later than that of the received print job data is extracted, as the deletion target print job data, from the one or more pieces of print job data in the buffer.

Since the print job data having a print designation time which is later than that of the print job data received by the data receiving unit is targeted for deletion from the buffer, it becomes possible to print preferentially the print job data having the relatively late print designation time. Consequently, it becomes possible to prevent reception of the print job data requiring immediate execution of the print operation, from denied due to shortage of the available space of the buffer.

According to another aspect of the invention, there is provided a computer readable medium having computer readable instruction stored thereon, which, when executed by a processor of a printing device, configures the processor to perform the steps of: receiving print job data; judging whether the received print job data can be stored in available space of a buffer for storing the print job data; and extracting deletion target print job data which can de deleted from the buffer, from among one or more pieces of print job data stored in the buffer in response to a judgment result that the received print job data can not be stored in available space of the buffer.

Since the deletion target extraction unit extracts the deletion target print job data to be deleted from the buffer, it becomes possible to secure available space in the buffer. Consequently, it becomes possible to prevent reception of the print job data requiring immediate execution of the print operation, from denied due to shortage of the available space of the buffer. Therefore, it becomes possible to effectively use the buffer and to perform the reserved print function smoothly.

In at least one aspect, the instruction further configures the processor to perform the step of controlling the buffer such that: in response to the judgment result that the received print job data can not be stored in available space of the buffer, the deletion target print job data is deleted from the buffer; and in response to a fact that available space for storing the received print job data is secured in the buffer, the received print job data is stored in the buffer. In this case, in the step of extracting, the print job data having a print designation time which is later than that of the received print job data is extracted, as the deletion target print job data, from the one or more pieces of print job data in the buffer.

Since the print job data having a print designation time which is later than that of the print job data received by the data receiving unit is targeted for deletion from the buffer, it becomes possible to print preferentially the print job data having the relatively late print designation time. Consequently, it becomes possible to prevent reception of the print job data requiring immediate execution of the print operation, from denied due to shortage of the available space of the buffer.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 6 illustrates an example of a data structure of a job list stored in a print server.

FIG. 7 illustrates an example of a data structure of print job data transmitted from a PC.

DETAILED DESCRIPTION

Hereafter, an embodiment according to the invention will be described with reference to the accompanying drawings.

Figure 1:
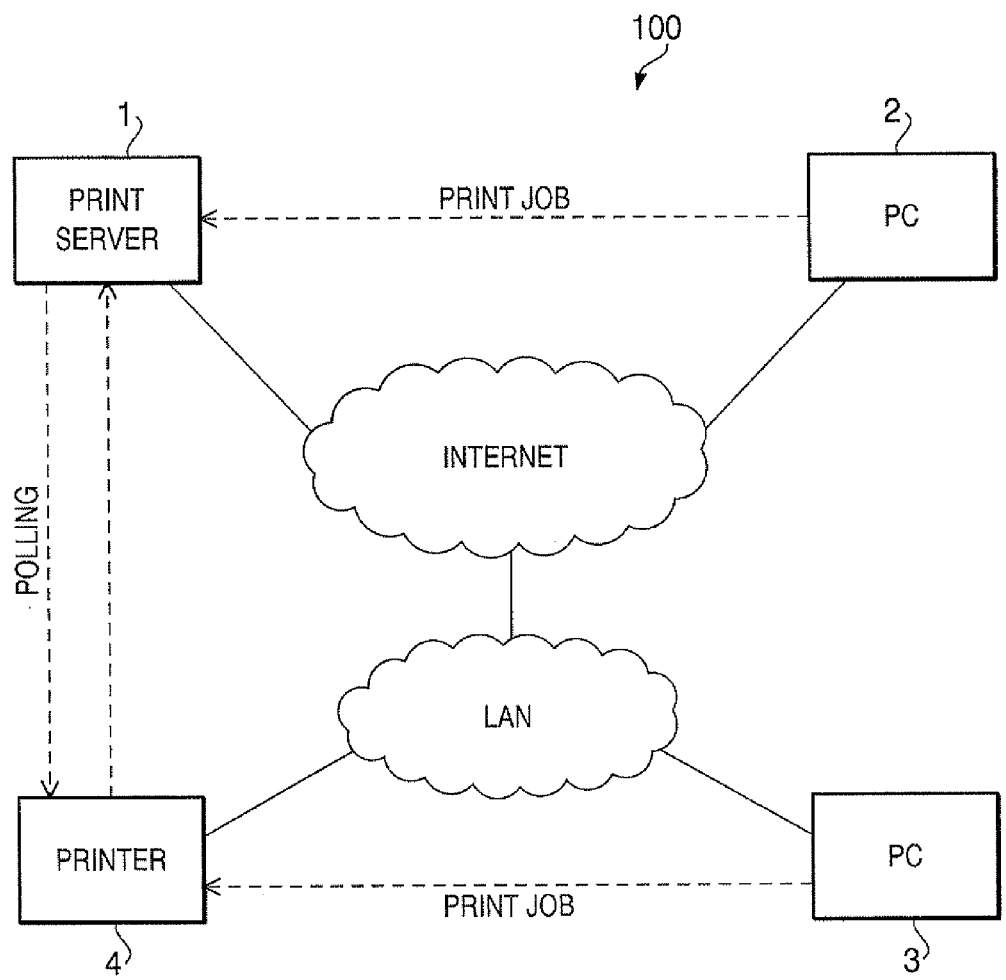
FIG. 1 illustrates a system configuration of a print system according to an embodiment.

FIG. 1 illustrates a system configuration of a print system 100 according to an embodiment. As shown in FIG. 1, the print system 100 includes a print server 1 which manages print jobs, PCs (personal computers) 2 and 3 each of which functions as an information processing terminal for generating print jobs, and a printer 4 which executes a print operation for print jobs. In the print system 100, the print server 1, the PCs 2 and 3 and the printer 4 are connected to each other through a network.

More specifically, the PC 2 is connected to the print server 1 through the internet. A print job transmitted by the PC 2 is registered in the print server 1 at first, and thereafter is transmitted from the print server 1 to the printer 4. On the other hand, the PC 3 is directly connected to the printer 4 through a LAN. A print job created by the PC 3 is transmitted directly to the printer 4 without intervention by the print server 1.

Although in FIG. 1 one PC is connected to the print server 1 and one PC is connected to the printer 4, the number of PCs connected to the print server 1 or the printer 4 is not limited to one. Two or more PCs may be connected to the print server 1, and two or more PCs may be connected to the printer 4.

In addition to a print function, the printer 4 has a function of requesting delivery of print job data and a function of receiving print job data. The printer 4 periodically requests the print server 1 to deliver print job data, for example, at time intervals of ten minutes. That is, the printer 4 polls the print serve 4 to check whether the print server 4 has print job data to be delivered to the printer 4. If more than one printer servers are provided in the print system 100, the printer 4 polls each of the print servers. In response to receipt of the print job data from the print server 1, the printer 4 executes a print operation for the received print job data.

In this embodiment, the print job data includes data of the type containing setting of a print designation time. In response to receipt of the print job data containing the print designation time, the printer 4 stores the received print job data in a look-ahead cache until the print designation time designated in the print job data is reached so that the print operation is started when the print designation time is reached. That is, the printer 4 has a reserved print function of subjecting the print job data to the print operation when the print designation time designated in the print job data is reached.

As described above, the printer 4 receives print job data transmitted from the print server 1 as well as print job data directly transmitted from the PC 3. Therefore, the printer 4 also subjects the print job data to the print operation when the printer 4 receives the print job data from the PC 3.

Figure 2:
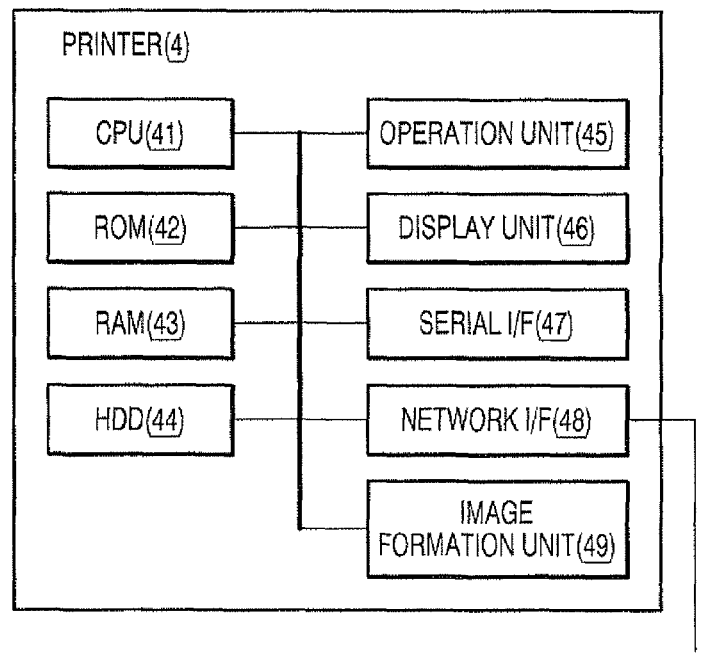
FIG. 2 is a block diagram of a printer provided in the print system.

As shown in FIG. 2, the printer 4 includes a CPU 41 which controls internal components in the printer 4 and executes various operations, a ROM 42 storing programs (e.g., BIOS) executed by the CPU 41, a RAM 43 used as a work memory for the CPU 41, and an HDD 44 storing various types of data and programs. The HDD 44 stores application programs, such as an operating system (OS) and a data management application for print job data.

The printer 4 further includes an operation unit 45 having operation buttons and a touch panel, a display unit 46 having a display (e.g., an LCD), a serial interface 47 for communicating with an external device via a serial signal, and a network interface 48 which interfaces the printer 4 with a network (e.g., a LAN and the internet).

The printer 4 further includes an image formation unit 49 which executes the print operation. For example, a print unit which executes an electrophotographic process or a print unit which executes an inkjet print process may be employed as the image formation unit 49. The image formation unit 49 may have a scanner to achieve a copying function.

Figure 3:
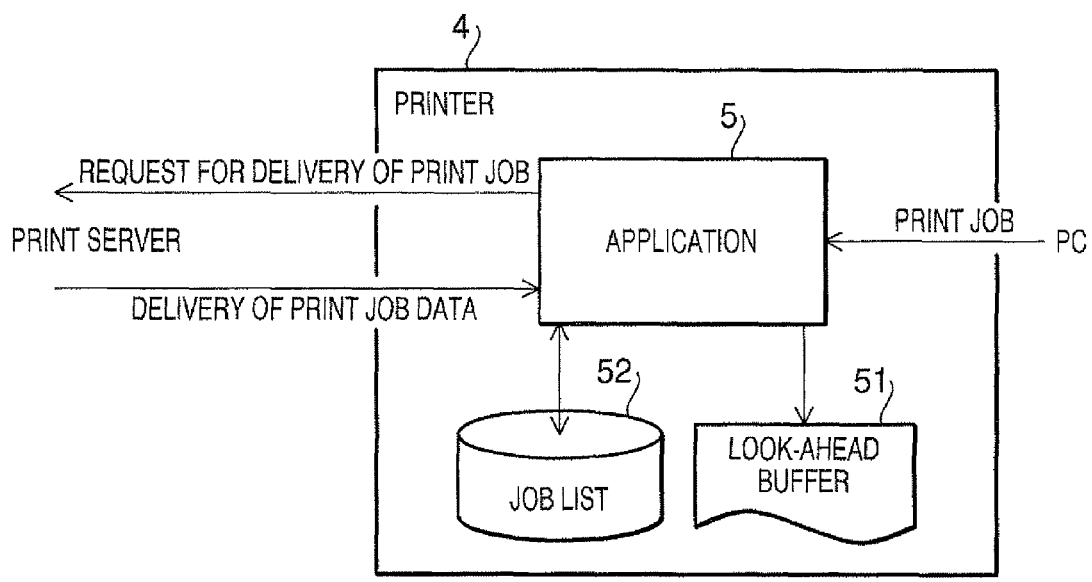
FIG. 3 is a functional block diagram illustrating functions of applications implemented on the printer.

As shown in FIG. 3, the printer 4 includes a data management application 5, a look-ahead buffer 51, and a job list 52 which is a registration list of print jobs. The data management application 5 is able to access the look-ahead buffer 51 and the job list 52. The data management application 5 receives the print job data from the print server 1 to update the look-ahead buffer 51 and the job list 52. The data management application 5 also receives the print job data directly transmitted from the PC 3 to update the look-ahead buffer 51 and the job list 52.

The look-ahead buffer 51 is a memory area used for execution of the print operation. The look-ahead buffer 51 also serves as a memory area for storing in advance print job data for reserved printing. The look-ahead buffer 51 is secured as a memory area having a predetermined size in the RAM 43 or in the HDD 44.

The print job data is accumulated in the look-ahead buffer 51 in the order in which the print job data was stored in the look-ahead buffer 51. When execution of a print job is finished, the print job data of the finished print job is deleted from the look-ahead buffer 51. When the look-ahead buffer 51 becomes full of data, the printer 4 executes a reshuffling process for print job data in the look-ahead buffer 51. The reshuffling process is described in detail later.

Figures 4, 5:
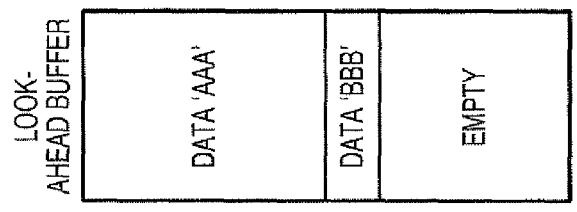
FIG. 4 illustrates an example of a data structure of a job list stored in the printer.
FIG. 5 illustrates an example of mapping of print job data in a look-ahead buffer.

FIG. 4 illustrates an example of a data structure of the job list 52. As shown in FIG. 4, the job list 52 stores, for each of records corresponding to print jobs, a job ID for identifying a print job, a URL representing a location of print target data, a buffer size of data stored in the look-ahead buffer 51, data size of the print job data, a print designation time, a re-reading flag indicating whether re-reading of the print job data is possible, and a deletion flag used temporarily as a deletion list of print job data. In the job list 52, the records are arranged in the order in which the print jobs of the records are executed.

Regarding each field of the "buffer size" in the job list 52, the data size which is the same as that of the print job data stored in the look-ahead buffer 51 is written to the field of the buffer size if the look-ahead buffer 51 stores the corresponding print job data, while "zero" is written to the field of buffer size if the look-ahead buffer 51 does not store the corresponding print job data.

Assuming that the total size of the look-ahead buffer 51 is 8M bytes and a plurality of pieces of print job data having job IDs of AAA, BBB and CCC are registered in this order in the job list 52, in this case the look-ahead buffer 51 stores the print job data of the job IDs AAA and BBB and the size of the available space of the look-ahead buffer 51 is 3M bytes (see FIG. 5). Since the size of the next print job data to be stored in the look-ahead buffer 51 next is 5M bytes, the printer 4 does not store the print job data of the job ID CCC. After the print operation for the print job AAA is finished and the print job AAA is deleted from the look-ahead buffer 51, the size of the available space of the look-ahead buffer 51 becomes 7M bytes. At this stage, the printer 4 stores the print job data CCC in the look-ahead buffer 51.

The print server 1 has a function of managing the print job data and a function of delivering the print job data to the printer 4. The print server 1 has a job list for managing the print job data. FIG. 6 illustrates an example of a data structure of the job list of the print server 1. As shown in FIG. 6, the job list stores, for each of records corresponding to print jobs, a job ID for identifying a print job, a URL representing a location of the print job data (i.e., a location of the print job data in the print server 1), a print designation time, a flag indicating whether re-reading of the print job data is possible, and the data size of the print job data.

The PC 2 has a function of creating print job data to be registered in the print server 1. FIG. 7 illustrates a data structure of the print job data created by the PC 2. As shown in FIG. 7, the print job data created by the PC 2 includes a job name, a URL representing a location of the print job data, a print designation time and print data. The PC 2 transmits the print job data to the print server 1. The print designation time may be set by a user of the PC 2. Since the user of the PC 2 is allowed to decide whether to designate a print designation time in the print job data, there is a possibility that the print job data for which a print designation time is not set is transmitted to the print server 1.

The PC 3 also has the function of creating print job data. The PC 3 does not exchange data with the print server 1, and transmits the print job data directly to the printer 4. That is, the print job data output by the PC 3 is not accumulated in the print server 1. Therefore, the print job data transmitted by the PC 3 is registered in a record of the job list 52 in the printer 4 such that re-reading of the print job data is disabled. Since as described above the user of the PC 3 does not necessarily set a print designation time for the print job data, the printer 4 may receive the print job data not having setting of a print designation time.

Figure 8:
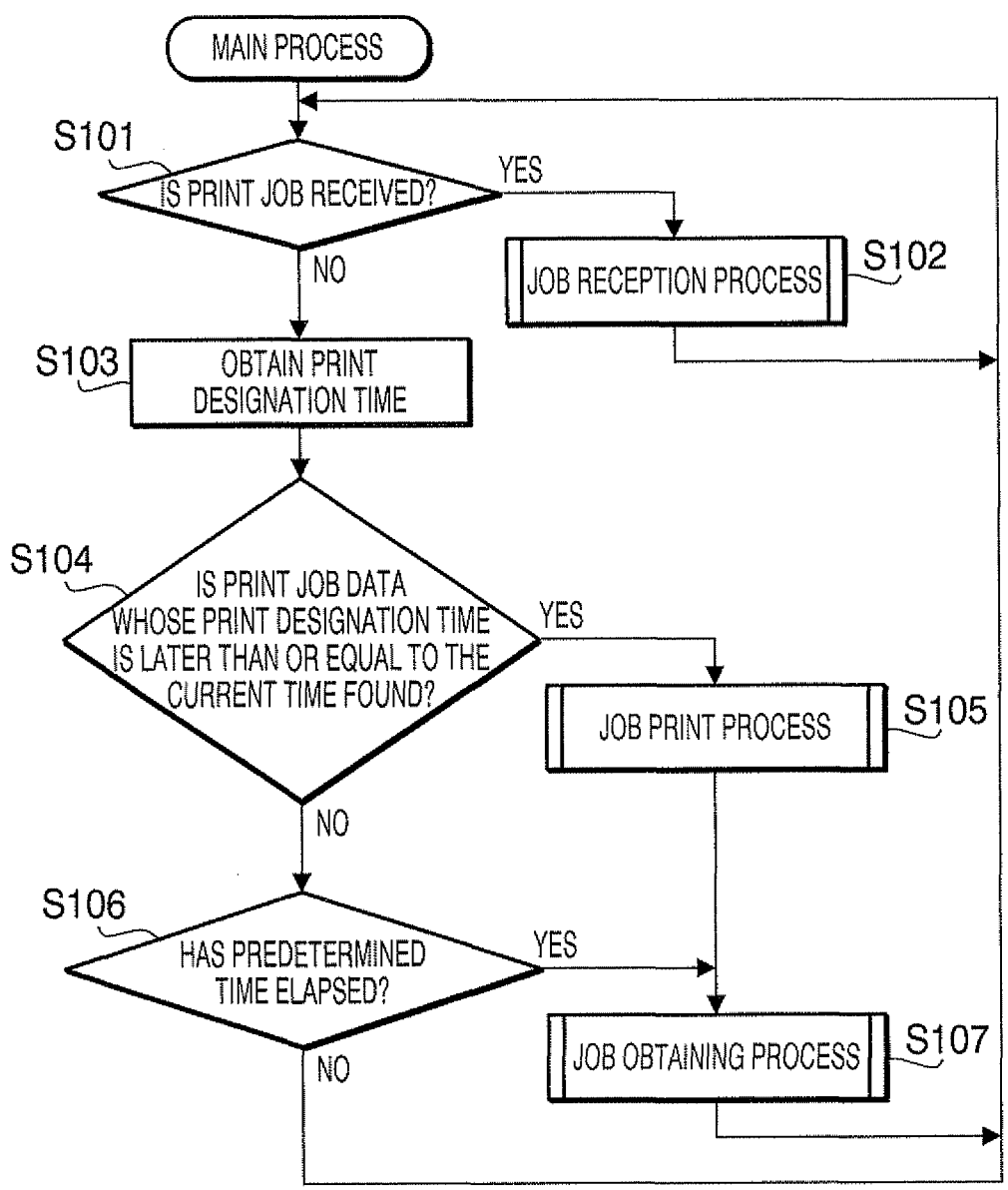
FIG. 8 is a flowchart illustrating a main process executed by the printer.

Hereafter, operations for achieving the reserved print function in the print system 100 are explained. FIG. 8 is a flowchart illustrating a main process of the printer 4. The main process is executed under control of the CPU 41 of the printer 4. The main process is started, for example, when power of the printer 4 is turned on.

First, the CPU 41 judges whether print job data is received (step S101). The printer 4 obtains print job data by polling the print server 1 or print job data transmitted from an information processing device (e.g., the PC 3) at irregular intervals. In step S101, the CPU 41 judges whether the print job data transmitted from an information processing device (e.g., the PC 3) at irregular intervals is received.

If the print job data is received (S101: YES), a job reception process for updating the look-ahead buffer 51 and the job list 52 is executed (step S102). After step S102 is processed, control returns to step S101. The job reception process is described in detail later. If the print job data is not received (S101: NO), control proceeds to step S103.

In step S103, the CPU 41 obtains the print designation time designated in the print job data registered in the job list 52. Then, the CPU 41 judges whether the print job data whose print designation time is later than or equal to the current time is found (step S104). If the print job data whose print designation time has already reached is found (S104: YES), the CPU 41 executes a job print process for executing the print operation for the found print job data (step S105). With this configuration, the reserved print function is achieved. The job print process is explained in detail later.

After the job print process is finished, control proceeds to step S107 where the CPU 41 obtains the print job data by polling a print server on the internet (e.g., the print server 1). Information concerning locations of print servers to be polled has been stored in advance in the printer 4.

If the print job data of which print designation time is later than or equal to the current time is not found (S104: NO), control proceeds to step S106.

In step S106, the CPU 41 judges whether a predetermined time has elapsed from immediately preceding transmission of the print job data. That is, the CPU 41 judges whether the time when polling of the print server 1 should be executed is reached. If the predetermined time period has elapsed (S106: YES), the CPU 41 executes a job obtaining process for transmitting a request for delivery of the print job to obtain the print job data. The job obtaining process is explained in detail later.

After the job obtaining process is finished or the predetermined time has not elapsed (S106: NO), control returns to step S101 to repeat the main process.

The print job data for which the print operation is finished in the job print process of step S105 is deleted from the look-ahead buffer 51. Therefore, available space can be secured in the look-ahead buffer 51. Since the main process is configured such that a request for delivery of the print job data is transmitted to the print server 1 in step S107 which follows step S105, it is possible to secure the available space in the look-ahead buffer 51. In this case, it becomes possible to check whether new print job data is stored in print server 1, and to obtain new print job data if the new print job data is stored in the print server 1.

Hereafter, the job reception process is explained with reference to FIG. 9.

First, the CPU 41 judges whether the received print job data has a print designation time (step S201). If the print job data does not have the print designation time (S201: NO), the printer 4 prints the print job data preferentially while receiving the print job data (step S202). When the printer 4 executes the print operation, the printer 4 uses the available space of the look-ahead buffer 51.

If the received print job data has a print designation time (S201: YES), the CPU 41 stores temporality the print job data in the look-ahead buffer 51 while receiving the print job data (step S203).

Figure 10:
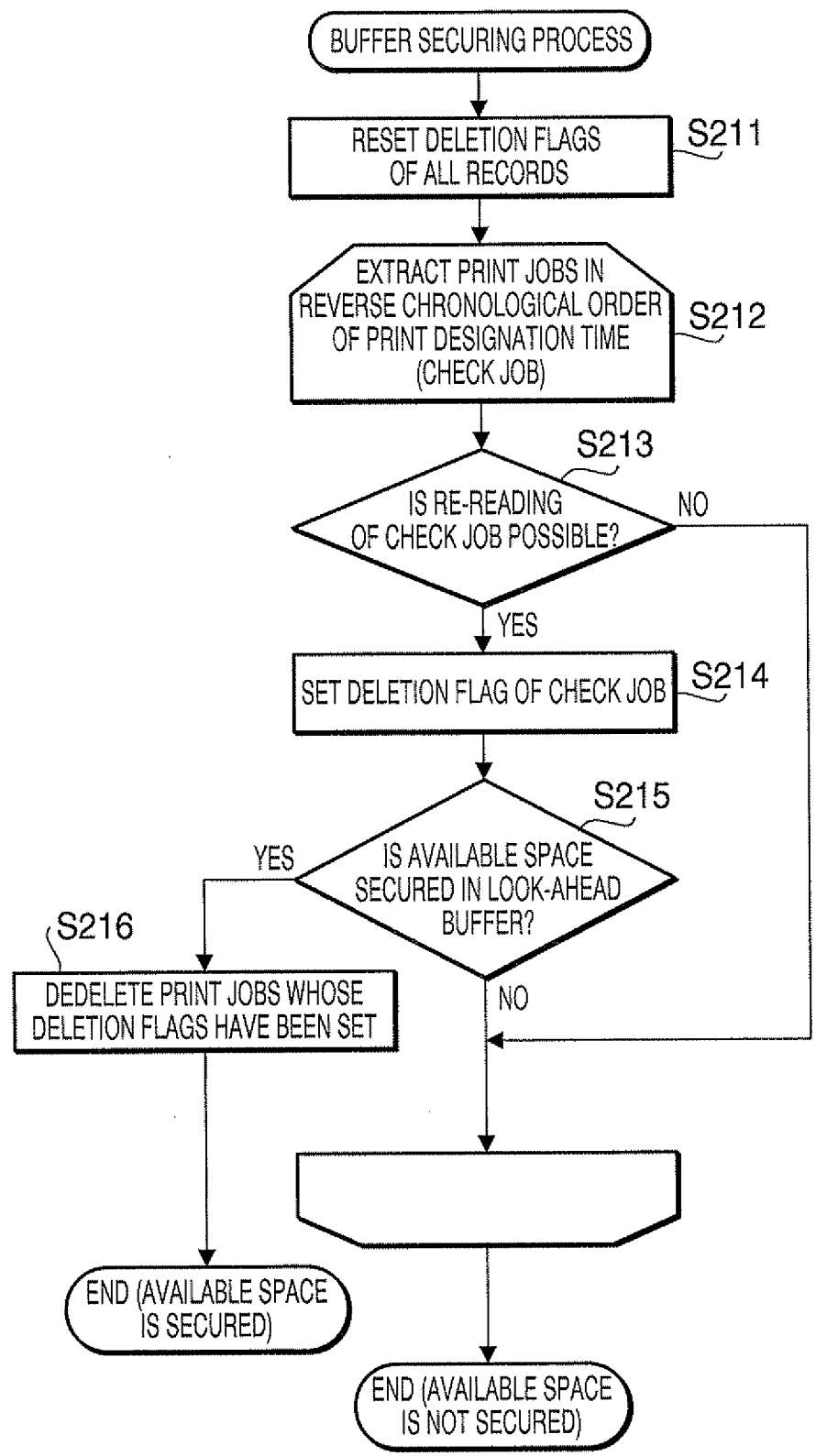
FIG. 10 is a flowchart illustrating a buffer securing process executed by the printer.

There is a possibility that the look-ahead buffer 51 becomes short of available space while the CPU 41 writes the print job data in the look-ahead buffer 51. That is, if the printer 4 judges that the size of the received print job data is larger than the available space of the look-ahead buffer 51 by comparing the size of the received print job data with the available space of the look-ahead buffer 51, the printer 4 judges that the look-ahead buffer 51 has become short of available space. In such a case, the printer 4 executes a buffer securing process shown in FIG. 10. The buffer securing process corresponds to the reshuffling process for the stored print job data.

When the buffer securing process is started, the CPU 41 resets all of the deletion flags in the records of the print jobs registered in the job list 52 (S211). Then, the CPU 41 extracts the print jobs in the reverse chronological order of the print designation time, and repeatedly executes a loop process starting from step S212. That is, the CPU 41 preferentially extracts the print job data having the latest print designation time from among one or more pieces of print job data not extracted. Hereafter, the print job picked up in step S212 is called a check print job.

In step S212, the CPU 41 judges whether re-reading of the print job data of the check print job is possible (step S213). If the re-reading of the print job data is not possible (S213: NO), the following steps are skipped to extract a next check print job. If the re-reading of the print job data is possible (S213: YES), the CPU 41 sets the deletion flag of the print job data corresponding to the check print job (step S214).

Next, the CPU 41 judges whether it is possible to secure a sufficient space for storing the print job data in the look-ahead buffer 51 (step S215). More specifically, the CPU 41 judges whether a following condition is satisfied.

(required space)≤(total size of all of the pieces print job data whose deletion flags are set)+(available space in the look-ahead buffer)     (1)

If it is possible to secure the available space in the look-ahead buffer 52 (S215: YES), control exits the loop process. Then, the CPU 41 deletes, from the job list 52, the record corresponding to the print job data deleted from the look-ahead buffer 51 (step S216). By this configuration, space sufficient for storing the received print job data can be secure in the look-ahead buffer 51. After step S216 is processed, the buffer securing process terminates.

On the other hand, if it is not possible to secure space sufficient for storing the received print job data (S215: NO), control returns to step S212 to extract a next check print job. If the CPU 41 is not able to secure space sufficient for storing the received print job data after all the check print jobs are checked in the loop process, the CPU 41 judges that no available space remains in the look-ahead buffer 51, and then the buffer securing process terminates.

Figure 9:
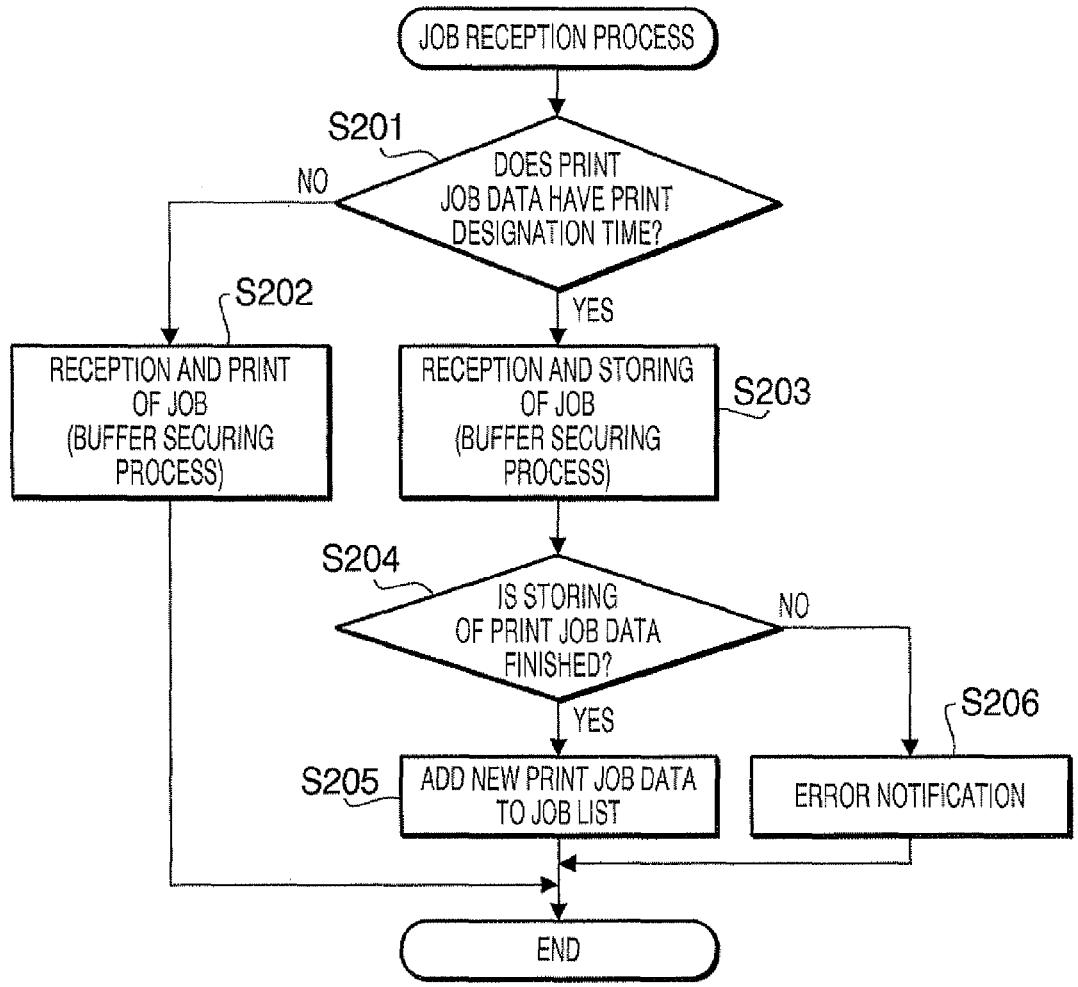
FIG. 9 is a flowchart illustrating a job reception process executed by the printer.

Returning back to the job reception process shown in FIG. 9, in step S202, the CPU 41 executes the buffer securing process when the look-ahead buffer 51 becomes short of the available space so that the print operation can be executed while securing the available space in the look-ahead buffer 51.

Similarly, in step S203, the CPU 41 executes the buffer securing process when the look-ahead buffer 51 becomes short of the available space so that the print job data can be stored while securing the available space in the look-ahead buffer 51.

After step S203 is processed, the CPU 41 judges whether storing of the received print job data is finished (step S204). If the storing of the print job data has been finished (S204: YES), the CPU 41 adds a record for the newly stored print job data to the job list 52 (step S205). When the CPU 41 adds the record to the job list 52, the CPU 41 sets the rereading flag to a disabled state indicating that the re-reading of the print job data is not possible. The reason is that the PC 3 may delete the print job data created in the PC 3 after the PC 3 transmits the print job data to the printer 4. Blank data is written to a filed of the item "URL" of the record of the newly added print job data because a location of the print job data does not exist for the newly added print job data.

If the storing of the print job data has not been finished (S204: NO), the CPU 41 deletes partly received print job data from the look-ahead buffer 51, and provides a notification that the look-ahead buffer becomes short of the available space through the display unit 46 (step S206). After step S205 or S206 is finished, the job reception process terminates.

Figure 11:
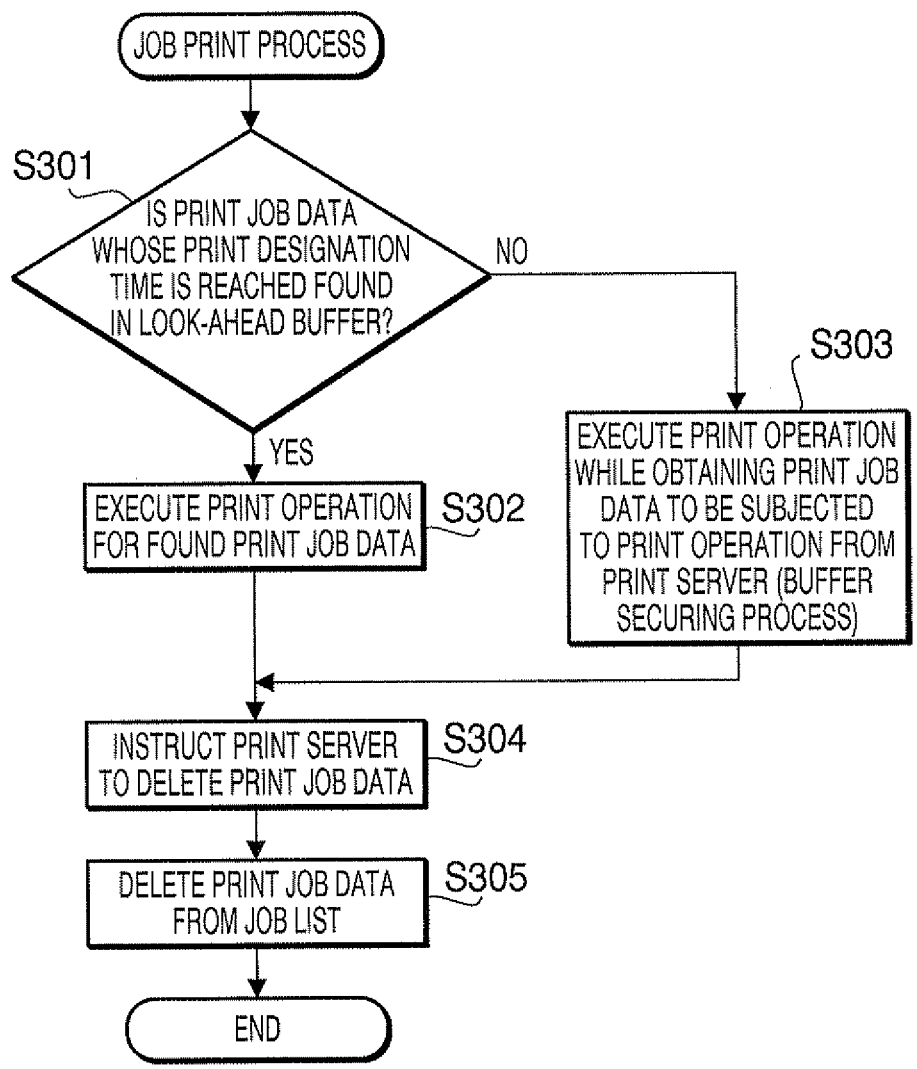
FIG. 11 is a flowchart illustrating a job print process executed by the printer.

FIG. 11 is a flowchart illustrating the job print process executed in step S105 under control of the CPU 41 of the printer 4.

When the job print process is started, the CPU 41 judges whether the print job data of which print designation time is reached is found in the look-ahead buffer 51 by referring to the job list 52 (step S301). If the print job data of which print designation time is reached is stored in the look-ahead buffer 51 (S301: YES), the CPU 31 executes the print operation for the found print job data (step S302).

On the other hand, if no print job data of which print designation time is reached is found (S301: NO), the CPU 41 executes the print operation while obtaining the print job data to be subjected to the print operation from the print server 1 (step S303). Each time the look-ahead buffer 51 becomes short of the available space during the obtaining of the print job data, the CPU 41 calls the buffer securing process shown in FIG. 10 to continue the print operation while deleting the stored data from the look-ahead buffer 51.

After step S302 or S303 is processed, the CPU 41 deletes the print job data for which the print operation is finished, from the look-ahead buffer 51. Next, the CPU 41 notifies the print server 1 of the completion of printing. More specifically, the CPU 41 sends a command to the print server 1 to instruct the print server 1 to delete the print job data which is stored in the print server 1 and corresponds to the print job data for which the print operation has been finished on the printer 4 (step S304). After receiving such a command from the printer 4, the print server 1 deletes the print job data stored in the print server 4.

By such a configuration, it is possible to prevent the print job data for which the print operation has been finished from being obtained again and from being subjected to the print operation again. In other words, it is possible to prevent the print job data for which the print operation has been finished, from occupying the look-ahead buffer 51 or from being subjected to the print operation again.

Next, the CPU 41 deletes, from the job list 52, the record corresponding to the print job data for which the print operation has been finished (step S305). Then, the job print process terminates.

Figure 12:
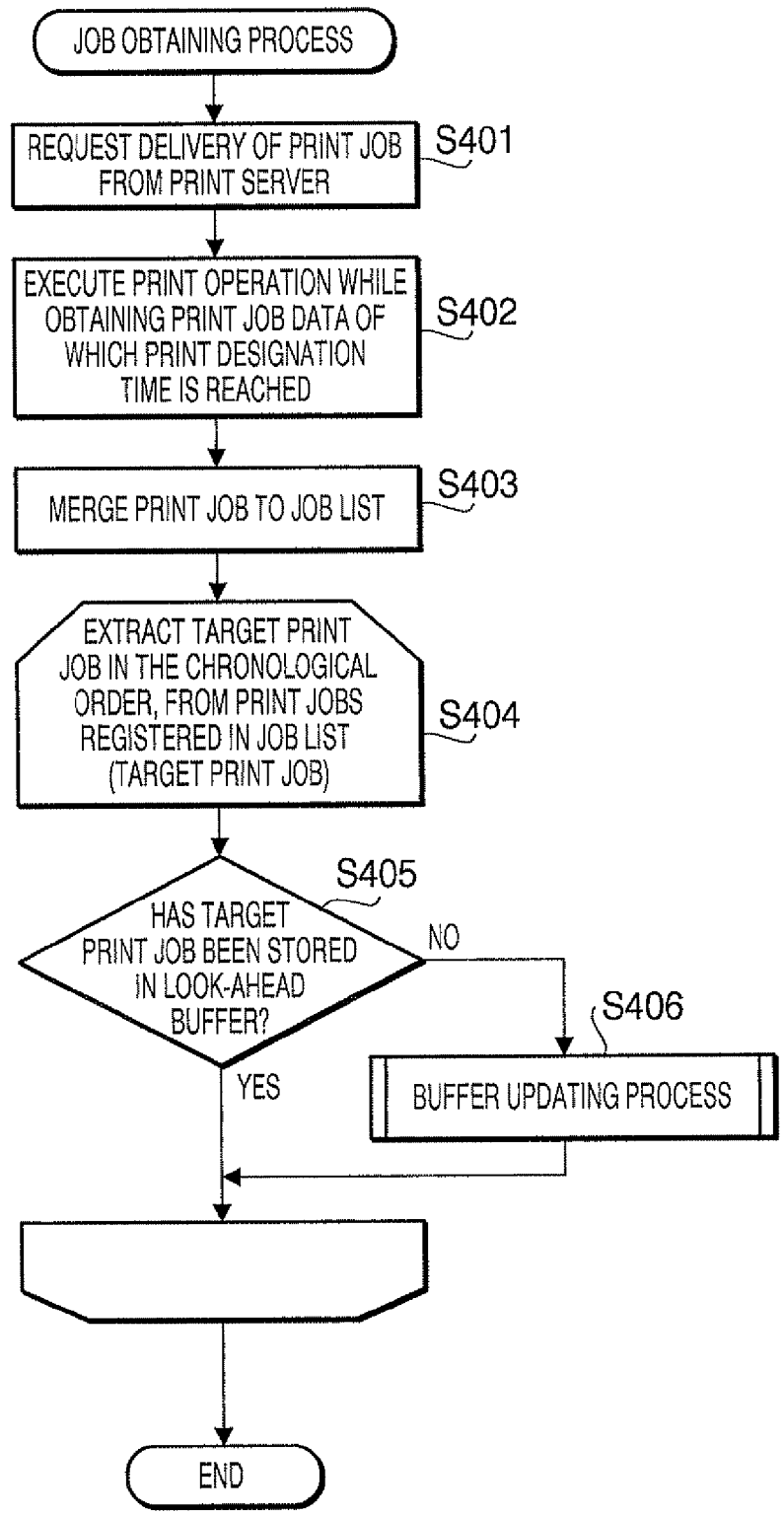
FIG. 12 is a flowchart illustrating a job obtaining process executed by the printer.

FIG. 12 is a flowchart illustrating the job obtaining process executed in step S107 under control of the CPU 41.

First, the CPU 41 transmits a request for delivery of a print job to a registered print server (i.e., the print server 1 in this embodiment) to start obtaining pint job data (step S401). When the print server 1 receives the request for delivery of a print job, the print server 1 transmits print job data registered in the job list of the print server 1 to a requesting source (e.g., the printer 4 in this embodiment).

Next, the CPU 41 extracts the print job data of which print designation time is reached, from the obtained print job data. Then, the CPU 41 executes the print operation while obtaining the print job data of which print designation time is reached (step S402). Furthermore, when the CPU 41 receives the print job data for which the print designation time is not set, the CPU 41 executes the print operation while obtaining such print job data. When the look-ahead buffer 51 becomes short of the available space during execution of the print operation, the CPU 41 calls the buffer securing process shown in FIG. 10 to execute the print operation while deleting the stored data from the look-ahead buffer 51.

Next, the CPU 41 merges the obtained print job data with the record in the job list 52 (step S403). More specifically, if the obtained print job data has not been registered in the job list 52, the CPU 41 registers the print job data in the job list 52 and sets the re-reading flag of the record corresponding to the obtained print job data to an enabled state indicating that the re-reading of the print job data is possible. If the obtained print job data has been already recorded in the job list 52, the CPU 41 executes no operation. If the print job data registered in the job list 52 is not transmitted from the print server 1, the CPU 41 sets the re-reading flag of such print job data to the disabled state.

Then, the CPU 41 extracts a target print job in the chronological order, from the print jobs registered in the job list 52 (step S404) to subject the extracted print job to a loop process starting from step S404.

In step S405, the CPU 41 judges whether the print job data corresponding to the target print job has been stored in the look-ahead buffer 51. If the target print job has already been stored (S405: YES), the CPU 41 skips step S406 and extracts a next target print job. On the other hand, if the target print job has not been stored (S405: NO), the CPU 41 executes a buffer updating process in step S406. The buffer updating process is explained in detail later. When all of the print jobs in the job list 52 have been subjected to the loop process, the job obtaining process terminates.

Figure 13:
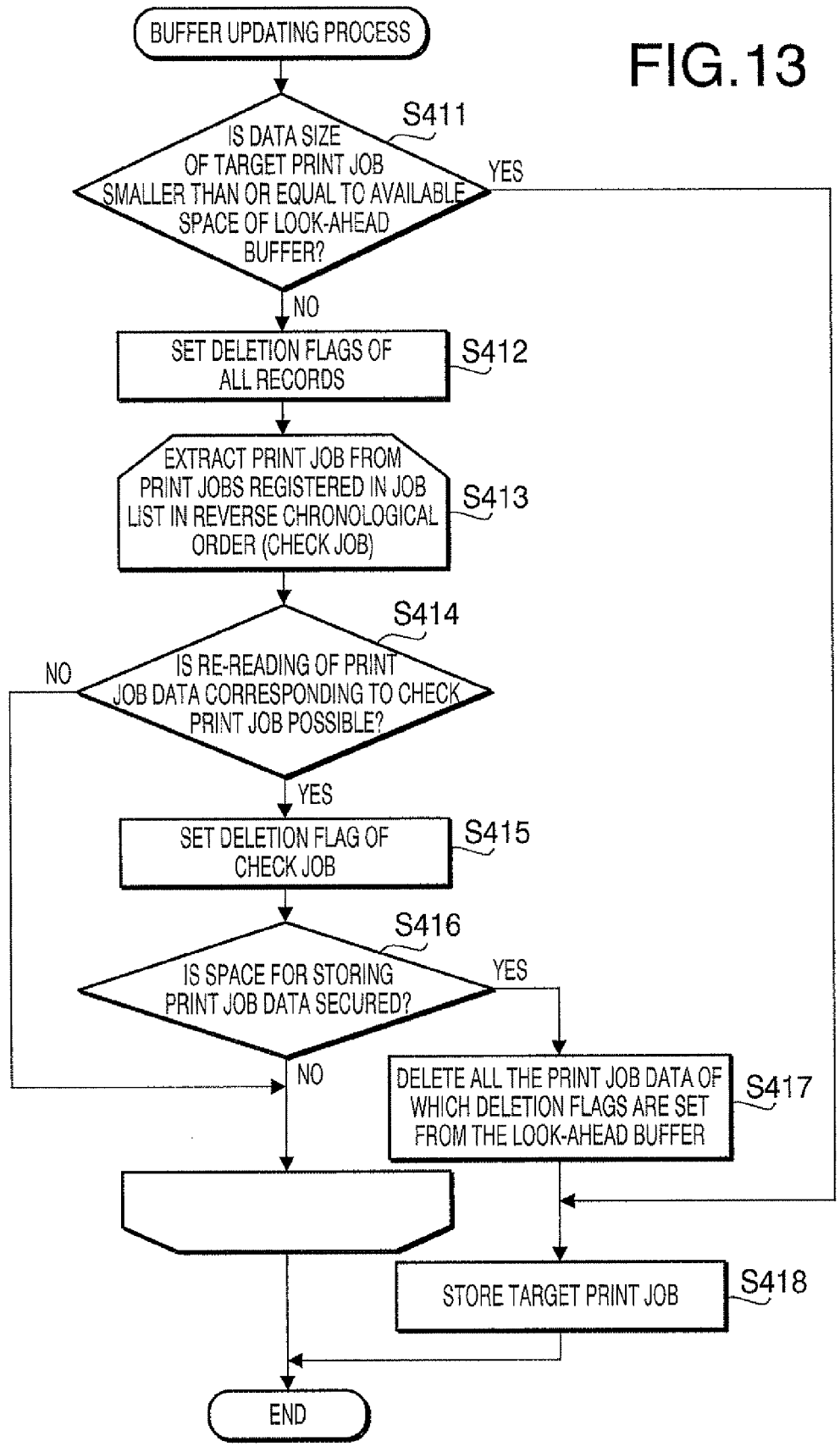
FIG. 13 is a flowchart illustrating a buffer updating process executed by the printer.

FIG. 13 is a flowchart illustrating the buffer updating process executed under control of the CPU 41 of the printer 4. The buffer updating process also corresponds to the reshuffling process for the stored print job data. When the buffer updating process is started, the CPU 41 judges whether the data size of the target print job is smaller than or equal to the available space of the look-ahead buffer 51 (step S411). If the data size of the target print job is smaller than or equal to the available space of the look-ahead buffer 51 (S411: YES), the CPU 41 stores the target print job in the look-ahead buffer 51 (step S418). Then, the buffer updating process terminates.

If the data size of the target print job is not smaller than or equal to the available space of the look-ahead buffer 51 (S411: NO), the CPU 411 resets the deletion flags of the records of all of the print jobs registered in the job list 52 (step S412). Then, the CPU 41 extracts the print job from the print jobs registered in the job list 52 in reverse chronological order. Hereafter, a targeted print job in a loop process from S413 is referred to as a check print job.

The CPU 41 judges whether the re-reading of the print job data corresponding to the check print job is possible (step S414). If the re-reading of the print job data corresponding to the check print job is not possible (S414: NO), steps S415-S416 are skipped to extract a next check print job.

If the re-reading of the print job data corresponding to the check print job is possible (S414: YES), the CPU 41 sets the deletion flag of the print job data corresponding to the check print job (step S415). Then, the CPU 41 judges whether it is possible to secure space for storing the print job data to be received (step S416). More specifically, the CPU 41 judges whether the available space for storing the print job data to be received satisfies the above described condition (1).

If it is possible to secure space for storing the print job data to be received (S416: YES), control exits the loop process and proceeds to step S417. In step S417, the CPU 41 deletes, from the look-ahead buffer 51, all the print job data of which deletion flags are set. Then, the CPU 41 deletes, from the job list 52, the records corresponding to the print job data deleted from the look-ahead buffer 51. By this configuration, space for storing the print job data to be received can be secured in the look-ahead buffer 51.

Next, the CPU 41 stores the target print job in the look-ahead buffer 51 (step S418). Since at this stage the space for storing the print job data to be received is secured in the look-ahead buffer 51, the target print job is stored reliably.

On the other hand, if it is not possible to secure space for storing the print job data to be received (S416: NO), control returns to step S413 to extract a next check print job. If the available space for storing the print job data to be received can not be secured after all of the print jobs having the print designation time later than the print designation time of the target print job are checked, control exits the loop process. Then, the buffer updating process terminates.

According to the above described buffer updating process, the print job data having the print designation time closer to the current time than another print job data is preferentially stored in the look-ahead buffer 51. Therefore, it is possible to smoothly execute the reserved print function.

As described above, the printer 4 has the reserved print function of executing the print operation in accordance with the print designation time. In the printer 4, the print job data is stored in the look-ahead buffer 51. The CPU 41 judges whether it is possible to store the print job data in the look-ahead buffer 51 by judging whether it is possible to store the print job data in the available space of the look-ahead buffer 51. If it is not possible to store the print job data (i.e., if the data size of the print job data is larger than the available space of the look-ahead buffer 51), the CPU 41 deletes the print job data having the print designation time later than that of the print job data to be stored (a storage target print job data). By this configuration, it becomes possible to store the print target print job data in the look-ahead buffer 51.

If the printer 4 does not have sufficient space for storing print job data, the printer 4 deletes the print job data having the print designation time later than the print designation of the storage target print job data. Therefore, when the size of the look-ahead buffer 51 becomes short, the print 4 reshuffles the look-ahead buffer 51 so that the print job data having an earlier print designation time is subjected to the print operation preferentially. In addition, it is possible to prevent reception of the print job data related to a print job requiring immediate execution of the print operation from being denied due to shortage of the available space of the look-ahead buffer 51.

The reshuffle of the print job data is executed automatically. Therefore, it is possible to effectively use the print data buffer, and to achieve a printing device configured to execute smoothly the reserved print function.

The job list 52 in the printer 4 stores, for each of the print jobs, information indicating whether the re-reading of the print job data from the print server 1 is possible. When the printer 4 reshuffles the print job data, the printer 4 targets, for deletion, only the print job data for which the re-reading is possible. Such a configuration makes it possible to prevent the print job data for which re-reading is not possible, from being deleted from the printer 4.

Therefore, even if both of the print job data for which re-reading is possible and the print job data for which re-reading is not possible exist in the look-ahead buffer 51, only the print job data for which the re-reading is possible is deleted. Consequently, it becomes possible to prevent the print job data for which re-reading is not possible, from being deleted from the printer 4.

When the print job data for which re-reading is not possible is received in a state where the available space of the look-ahead buffer 51 is at a low level, the printer 4 is able to continue to receive such print job data without stopping to receive the print job data. Therefore, the print job data for which re-reading is not possible can be printed with reliably. That is, even if both of the print job data for which re-reading is possible and the print job data for which re-reading is not possible exist in the look-ahead buffer 51, the reliability of the reserved print function can be maintained.

The printer 4 selects the print job data having setting of a print designation time as targets for deletion rather than selecting the print job data not having setting of a print designation time as targets for deletion. Therefore, even if the printer 4 receives the print job data not having the print designation time, the printer 4 does not stop the print operation for the print job data not having the print designation time. Therefore, it is possible to reliably print the print job data not having the print designation time. Even if both of the print job data having the print designation time and the print job data not having the print job data exist in the look-ahead buffer 51, reliability of the reserved print function can be maintained.

Although the present invention has been described in considerable detail with reference to certain preferred embodiments thereof, other embodiments are possible.

In the above described print system 100, the various functions according to the embodiment are implemented on a printer (i.e., the printer 40). However, the above described various functions may be implemented on various types of printing devices, such as a facsimile device or a multifunction peripheral.

In the above described print system 100, a PC (i.e., the PC 2 and PC 3) is used as a device for registering print jobs. However, various types of devices, such as a mobile phone, may be employed as a device for registering print jobs.

In the above described embodiment, the print job data is delivered to the printer 4 in response to polling from the printer 4. However, delivery of the print job data to the printer 4 may be achieved in a different way. For example, a destination e-mail address to which the print job data is to be delivered may be registered in the print server 1. In this case, the print server 1 actively transmits the print job data to the printer 4.

Before the printer 4 obtains the print job data from the print server 1 in step S401 of FIG. 12, the printer 4 may obtain the job list from the print server 1. In this case, the printer 4 is able to obtain the print job data which the printer 4 does not have, by comparing the job list 52 stored therein with the job list obtained from the print server 1. In this case, the network traffic can be decreased because unnecessary poling can be omitted. In addition, the processing load applied to the printer 4 for discarding the print job data stored in the printer 4 can be reduced.

The PC 2 may be configured such that if the print designation time is not set to the print job data to be transmitted to the print server 1, the PC 2 sets the current time to the print job data as the print designation time. That is, in this case, the PC 2 sets the time at which the print job data is transmitted to the print server 1 as the print designation time. When such print job data arrives at the print server 1, the print designation time of the print job data has been already reached. Therefore, when the print job data is transmitted from the print server 1 to the printer 4, the printer 4 immediately starts the print operation for the received print job data. Therefore, the print job data for which the print designation time is not set by the user is treated as print job data to be subjected to the print operation immediately. Such a configuration enhances the usability of the printing device having the reserved plant function.

What is claimed is:

1. A printing device, comprising:
a data receiving unit configured to receive print job data;
a buffer used to store the received print job data;
a judgment unit configured to judge whether the print job data received by the data receiving unit can be stored in available space of the buffer;
a deletion target extraction unit configured such that, in response to the judgment unit judging that the print job data received by the data receiving unit cannot be stored in the available space of the buffer, the deletion target extraction unit extracts print job data different from the received print job data as deletion target print job data which can be deleted from the buffer, from among one or more pieces of print job data stored in the buffer;
a buffer controller that controls the buffer such that:
in response to the judgment unit judging that the print job data received by the data receiving unit cannot be stored in the available space of the buffer, the deletion target print job data is deleted from the buffer; and
in response to a fact that the available space for storing the print job data received by the data receiving unit is secured in the buffer, the print job data received by the data receiving unit is stored in the buffer; and
a reread judging unit configured to judge whether the print job data can be reread from a sender of the print job data;
wherein the deletion target extraction unit extracts the print job data as the deletion target print job data in the buffer having a print designation time which is later than that of the print job data received by the data receiving unit and which is judged that it can be reread from the sender thereof, from the one or more pieces of print job data in the buffer; and
wherein the deletion target extraction unit does not extract, as the deletion target print job data, the print job data in the buffer which is judged that it cannot be reread from the sender thereof, even if the print job data has the print designation time which is later than that of the print job data received by the data receiving unit.

2. The printing device according to claim 1, further comprising:
a storage unit configured to store, for each of the one or more pieces of print job data, information indicating whether the print job data can be reread from the sender of the print job data,
wherein the deletion target extraction unit extracts the print job data having the information, in the storage unit, indicating that the rereading from the sender is possible, as the deletion target print job data.

3. The printing device according to claim 2, wherein if the print job data received by the data receiving unit cannot be reread from the sender of the received print job data,
the judgment unit judges whether the print job data received by the data receiving unit can be stored in the available space of the buffer,
the deletion target extraction unit extracts, as the deletion target print job data, the print job data having the information, in the storage unit, indicating that the rereading from the sender is possible if the judgment unit judges that the received print job data cannot be stored in the available space of the buffer,
the buffer controller deletes the deletion target print job data extracted by the deletion target extraction unit, and
the buffer controller stores the print job data received by the data receiving unit in the buffer in response to the fact that space for storing the print job data received by the data receiving unit is secured in the buffer.

4. The printing device according to claim 2, wherein if the print job data in which the print designation time is not set is received by the data receiving unit,
the judgment unit judges whether the print job data received by the data receiving unit can be stored in available space of the buffer,
the deletion target extraction unit extracts the print job data in which the print designation time is not set and for which the rereading from the sender is possible if the judgment unit judges that the received print job data cannot be stored in the available space of the buffer,
the buffer controller deletes the deletion target print job data extracted by the deletion target extraction unit, and
the buffer controller stores the print job data received by the data receiving unit in the buffer in response to the fact that the space for storing the print job data received by the data receiving unit is secured in the buffer.

5. The printing device according to claim 1, wherein the data receiving unit obtains again the deleted print job data deleted by the buffer controller by polling the sender of the deleted print job data.

6. The printing device according to claim 1, further comprising a notification unit configured such that, in response to completion of a print operation for the print job data, the notification unit transmits, to the sender of the print job data, a command for deleting the print job data stored in the sender.

7. The printing device according to claim 1, wherein:
the data receiving unit receives the print job data from a print server; and
the deletion target extraction unit extracts the print job data which is retained in the print server, as the deletion target print job data.

8. A method to be implemented on a printing device performing a printing operation, the method comprising the steps of:
receiving print job data;
judging whether the received print job data can be stored in available space of a buffer for storing the received print job data;
judging whether the print job data can be reread from a sender of the print job data;
extracting print job data different from the received print job data as deletion target print job data which can be deleted from the buffer, from among one or more pieces of print job data stored in the buffer in response to a judgment result that the received print job data cannot be stored in the available space of the buffer; and
controlling the buffer such that:
in response to the judgment unit judging that the received print job data cannot be stored in the available space of the buffer, the deletion target print job data is deleted from the buffer; and
in response to a fact that the available space for storing the received print job data is secured in the buffer, the received print job data is stored in the buffer; and
wherein, in the step of extracting, the deletion target print job data in the buffer having a print designation time which is later than that of the received print job data and which is judged that it can be reread from the sender thereof is extracted, from the one or more pieces of the print job data in the buffer; and wherein the step of extracting does not extract, as the deletion target print job data, the print job data in the buffer which is judged that it cannot be reread from the sender thereof, even if the print job data has the print designation time which is later than that of the received print job data.

9. A non-transitory computer readable medium having computer readable instruction stored thereon, which, when executed by a processor of a printing device, configures the processor to perform the steps of:

receiving print job data;

judging whether the received print job data can be stored in available space of a buffer for storing the received print job data;

judging whether the print job data can be reread from a sender of the print job data;

extracting print job data different from the received print job data as deletion target print job data which can be deleted from the buffer, from among one or more pieces of print job data stored in the buffer in response to a judgment result that the received print job data cannot be stored in the available space of the buffer; and configuring the processor to perform the step of controlling the buffer such that:

in response to the judgment result that the received print job data cannot be stored in the available space of the buffer, the deletion target print job data is deleted from the buffer; and in response to a fact that the available space for storing the received print job data is secured in the buffer, the received print job data is stored in the buffer; and wherein, in the step of extracting, the deletion target print job data in the buffer having a print designation time which is later than that of the received print job data and which is judged that it can be reread from the sender thereof is extracted, from the one or more pieces of the print job data in the buffer; and wherein the step of extracting does not extract, as the deletion target print job data, the print job data in the buffer which is judged that it cannot be reread from the sender thereof, even if the print job data has the print designation time which is later than that of the received print job data.

10. A printing device configured to communicate with a print server which stores print job data, the printing device comprising:

a data receiving unit configured to receive the print job data;

a buffer used to store the received print job data;

a judgment unit configured to judge whether the print job data received by the data receiving unit can be stored in available space of the buffer;

a deletion target extraction unit configured such that, in response to the judgment unit judging that the print job data received by the data receiving unit cannot be stored in the available space of the buffer, the deletion target extraction unit extracts print job data different from the received print job data as deletion target print job data which can be deleted from the buffer, from among one or more pieces of print job data stored in the buffer;

a buffer controller that controls the buffer such that:

in response to the judgment unit judging that the print job data received by the data receiving unit cannot be stored in the available space of the buffer, the deletion target print job data is deleted from the buffer; and in response to a fact that the available space for storing the print job data received by the data receiving unit is secured in the buffer, the print job data received by the data receiving unit is stored in the buffer; and a sender judging unit configured to judge whether the print job data received by the data receiving unit is received from the print server, wherein the deletion target extraction unit extracts the print job data as the deletion target print job data the deletion target print job data in the buffer having a print designation time which is later than that of the print job data received by the data receiving unit and which is judged that it can be reread from the print server, from the one or more pieces of print job data in the buffer; and wherein the deletion target extraction unit does not extract, as the deletion target print job data, the print job data in the buffer which is not judged to be received from the print server, even if the print job data has the print designation time which is later than that of the print job data received by the data receiving unit.

* * * * *